April 7, 1970 D. B. SUGDEN 3,504,990
UNDULATING FLOW PROMOTING ROTOR AND ASSEMBLIES EMBODYING SAME
Original Filed May 9, 1967 6 Sheets-Sheet 1

DIRECTION OF ROTATION

DIRECTION OF FLUID FLOW

INVENTOR.
DAVID B. SUGDEN
BY
ATTORNEYS

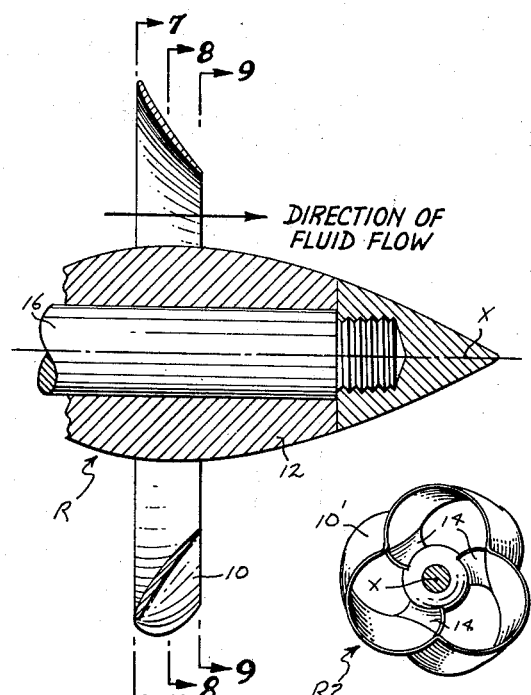

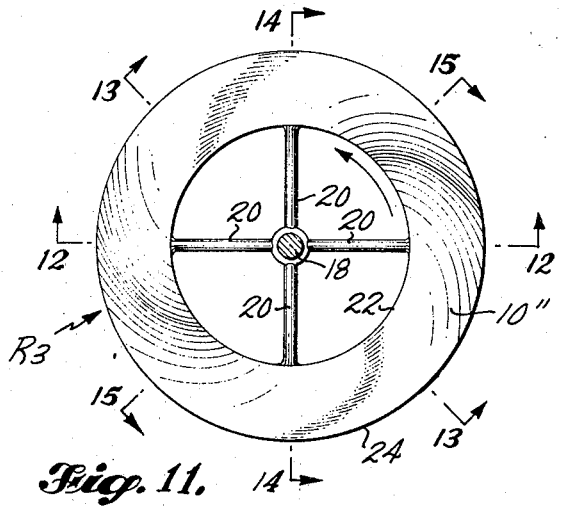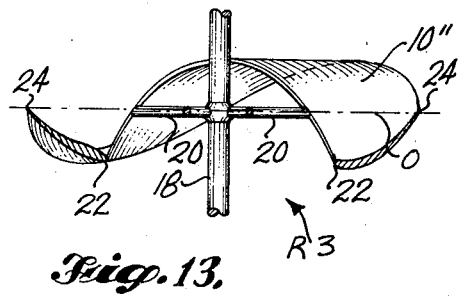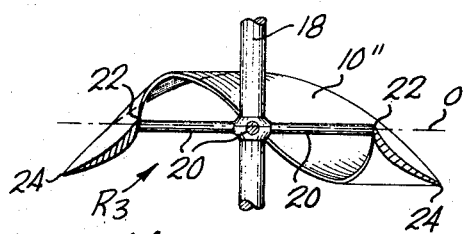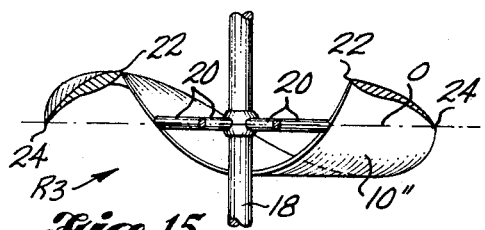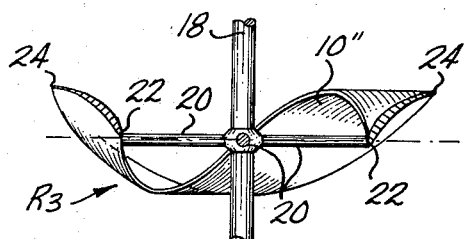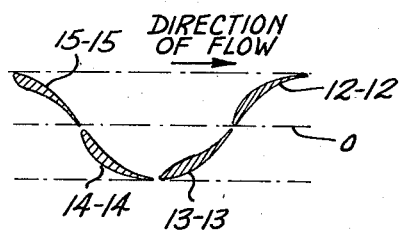

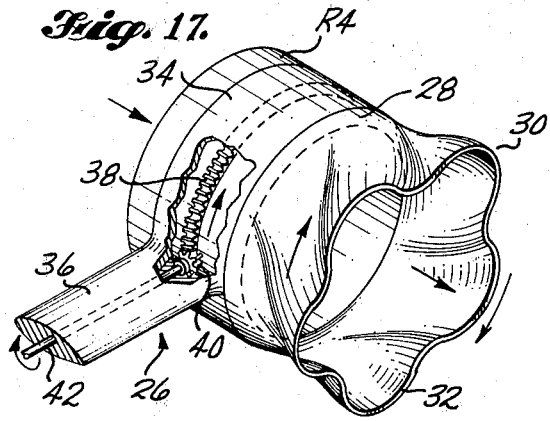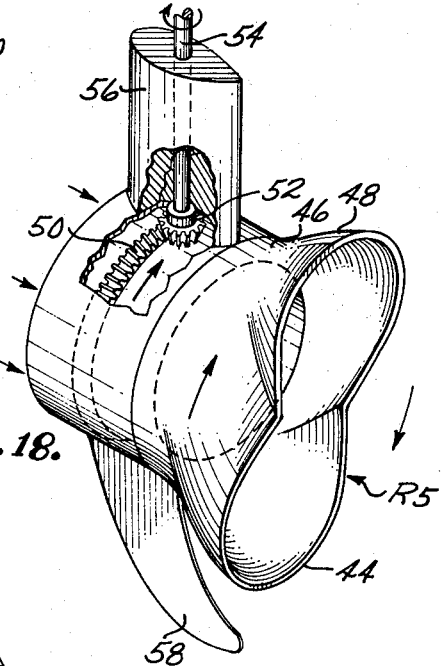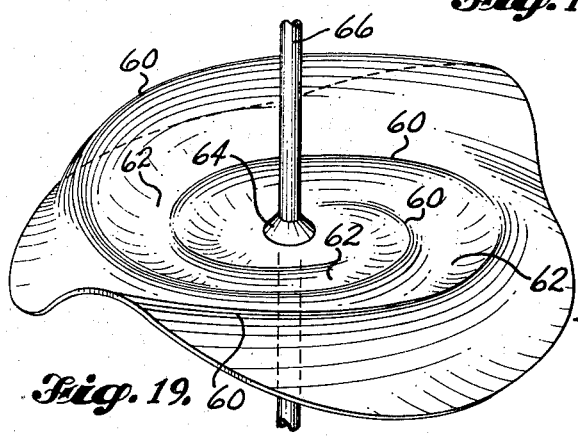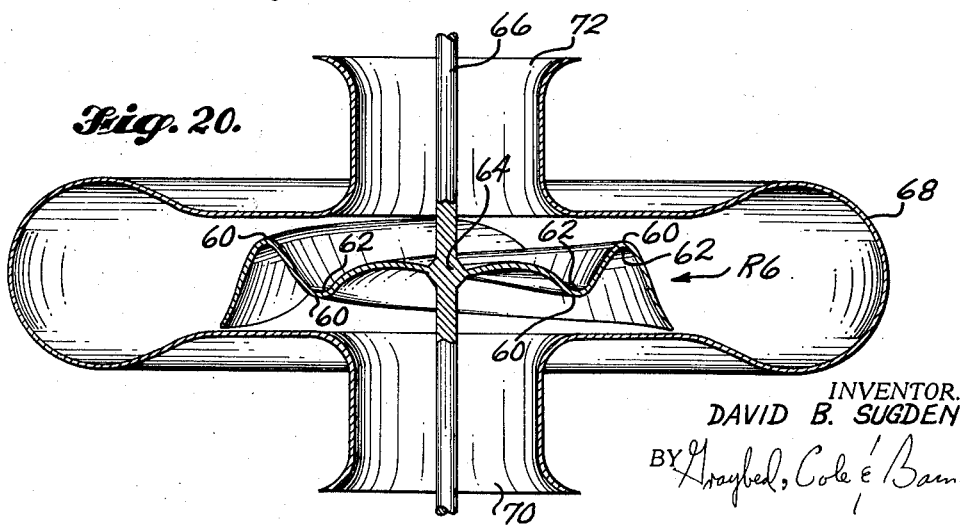

April 7, 1970 D. B. SUGDEN 3,504,990
UNDULATING FLOW PROMOTING ROTOR AND ASSEMBLIES EMBODYING SAME
Original Filed May 9, 1967 6 Sheets-Sheet 5

INVENTOR.
DAVID B. SUGDEN
BY Graybeal, Cole & Barnard
ATTORNEYS

April 7, 1970 D. B. SUGDEN 3,504,990
UNDULATING FLOW PROMOTING ROTOR AND ASSEMBLIES EMBODYING SAME
Original Filed May 9, 1967 6 Sheets-Sheet 6
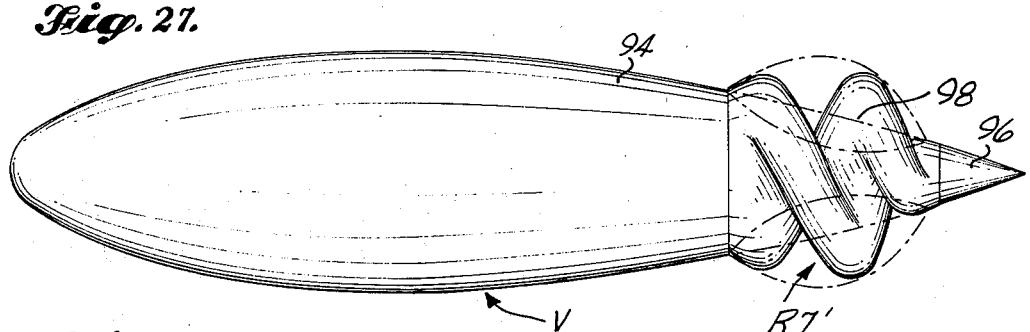
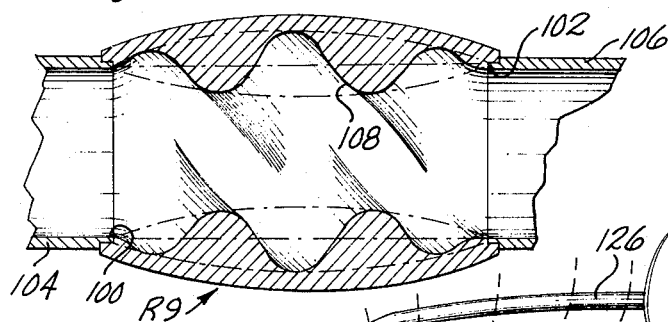
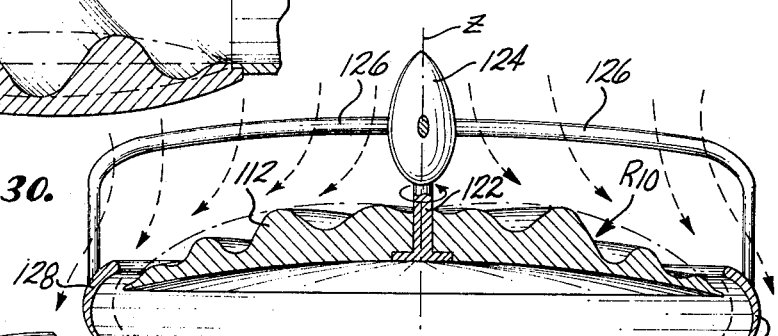
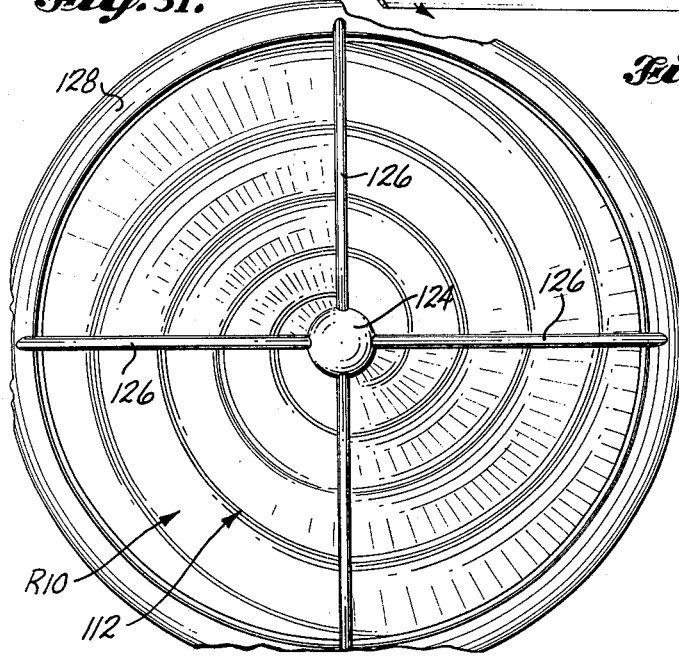
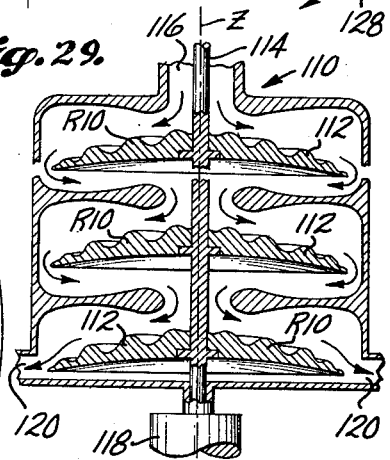
INVENTOR.
DAVID B. SUGDEN
BY Graybeal, Cole & Barnard
ATTORNEYS United States Patent Office 3,504,990
Patented Apr. 7, 1970

3,504,990
UNDULATING FLOW PROMOTING ROTOR AND
ASSEMBLIES EMBODYING SAME
David B. Sugden, 33 Kingston Heights, Kingston Beach,
Tasmania, Australia
Continuation of application Ser. No. 637,185, May 9,
1967. This application May 26, 1969, Ser. No. 828,809
Int. Cl. B63h 7/02, 1/04
U.S. Cl. 416—176                                13 Claims

ABSTRACT OF THE DISCLOSURE

A propeller, impeller, pump or turbine rotor of varying axial section shape from each axial section station to the next about the rotational axis, collectively forming a continuous smoothly undulating sinuous working surface. Vehicles, pumps, motors, and a ground effect machine incorporating such a rotor.

CROSS-REFERENCE TO RELATED
APPLICATIONS

This is a continuation of my copending application Ser. No. 637,185, entitled Undulating Flow Promoting Rotor and Assemblies Embodying Same, filed May 9, 1967 as a continuation-in-part of my copending application Ser. No. 624,419, filed Mar. 20, 1967, and entitled Undulating Flow Promoting Rotor.

BACKGROUND OF THE INVENTION

Field of the invention

This invention relates to the broad field of fluid mechanics, and more particularly to rotary fluid driving or driven devices, including propellers, impellers, and turbine wheels. It also relates to vehicle sustaining and/or propulsion devices of the bladed rotor type, and to vehicular combinations including same.

Description of the prior art

Propellers comprising annular or ring type blade elements are disclosed in Bovyer, U.S. Patent No. 342,572; Woodyard, U.S. Patent No. 1,103,855; Alexandre, U.S. Patent No. 2,569,273; British Patent No. 11,212/1890 and Italian Patent No. 521,551.

Axially elongated helical screw type propellers or sustaining devices are disclosed by Butow, U.S. Patent No. 1,015,540; Snook, U.S. Patent No. 1,069,906; and Masnaia, U.S. Patent No. 53,316. Hoskin, U.S. Patent No. 622,474 contains a typical disclosure of a helical pump rotor.

Moineau, U.S. Patent No. 1,892,217; Waldin, U.S. Patent No. 2,752,860 and Lindberg, U.S. Patent No. 3,208,391 disclose positive displacement type pumps which include rotor elements of actual or near helical form.

Clark, U.S. Patent No. 3,221,702 discloses a generally cigar shaped vehicle provided with an expansible contractible skin and internal means for generating a sine-like wave which travels along the length of the body. This motion of the skin provides propulsive motion to the vehicle.

SUMMARY OF THE INVENTION

The present invention basically relates to a rotary element configured to while rotating promote undulating flow in a fluid in which it is placed. Such element may be used either as an impeller for adding energy to the fluid, for pumping it or creating thrust, or as a turbine rotor for taking energy from a moving fluid stream. Some embodiments at least may also be used for moving or pumping granular solid materials.

Basically, undulating flow promoting rotors of the present invention have continuous wavy working surfaces, each characterized by a progressively changing axial section profile, the successive profile stations of which also constitute successive stations along a smoothly undulating curve or wave developed during rotation. During rotation of the rotor the relative movement of the working surface (or surfaces) at any axial section is similar to, and is derived from the undulating action of a fish's tail or bird's wing. In the case of an impeller this action is utilized to provide a propulsive effect. In a turbine it causes rotation of the rotor.

According to the invention, the undulating curve developed at each axial station may extend either radially or axially of the rotor, or in a combined direction. A rotor of the radial type may comprise one or two side located working surfaces formed by a center-to-edge spiral pattern of smoothly rounded ridge and channel areas of similar but opposite transverse curvature. Another radial form is annular and includes two working surfaces and a variable camber axial section profile. In one axial form the rotor is axially elongated and the working surface is formed on the outer periphery of the rotor.

Another axial form of rotor embodying undulating flow promoting principles of the present invention is of annular form and has a single working surface of the character described formed on its inner surface.

In a further axial flow form of rotor, the rotor includes an annular blade having both inner and outer working surfaces. The surfaces are similarly convoluted and in such a manner that when the blade is rotated its axial section profile (and the axial section profile or outline of each working surface thereof) varies continuously at each profile station about the axis of rotation, but is always a part of a continuous, smoothly undulating curve of constant amplitude whose phase angle changes continuously and smoothly with rotation, and whose axis of generation remains fixed in relation to the axis of rotation.

The working surface or surfaces of each axial form of the rotor are characterized by a multicuspal cross-sectional configuration, formed by the development of plural sine-like waves on a circle concentrically surrounding the axis of rotation, and constituting a radial plane portion of the axis of generation for the working surface or surfaces, which is cylindrical in nature. Common points on the leading and trailing edges of the surface or surfaces, and on all axial sections therebetween, lie on helixes which wind from the leading edge to the trailing edge. Another form includes a nonworking cylindrical portion smoothly jointed to a varying amplitude, bi-surface working portion.

Other aspects of the present invention involve a ground effect machine comprising the radial form of rotor as its fluid current producing impeller element; pumps and turbines comprising axial or radial flow rotors characteristic of the invention; a vehicle propulsion system comprising an axially elongated rotor of the exterior working surface type incorporated into the body of the vehicle, as a rotating section thereof; a marine propeller comprising the annular rotor with two working surfaces; and a sustaining wing for a helicopter or the like incorporating an annular rotor.

BRIEF DESCRIPTION OF DRAWING
FIGURES

Referring to the drawing wherein like reference characters designate like parts throughout the several views:

FIG. 4 is a sectional view similar to FIG. 3, but taken substantially along line 4—4 of FIG. 2, and including a broken line showing of the right cylindrical axis of evolution of the undulating impeller surfaces, and an axial development along said axis of a substantial sinusoidal curve which is defined by the impeller surfaces;

FIG. 5 is a sectional view like FIGS. 3 and 4, but taken at a different section, substantially along lines 5—5 of FIG. 2;

FIG. 6 is a sectional view like FIGS. 3–5, but taken at still another section, substantially along lines 6—6 of FIG. 2;

FIG. 7 is a cross-sectional view showing the cross-sectional configuration of the impeller, and angular orientation of the lobes, at the axial station identified by line 7—7 in FIG. 5;

FIG. 8 is a view generally like FIG. 7, but taken substantially along line 8—8 of FIG. 5;

FIG. 9 is a view generally like FIGS. 7 and 8, but taken substantially along line 9—9 of FIG. 5;

FIG. 10 is a view generally like FIG. 3, but on a smaller scale, and on a three lobe propeller;

FIG. 11 is a top plane view of a radial flow form of annular rotor;

FIG. 12 is an axial section view of the rotor of FIG. 11, taken substantially along line 12—12 of FIG. 11;

FIG. 13 is a sectional view similar to FIG. 12, but taken substantially along line 13—13 of FIG. 11;

FIG. 14 is a sectional view like FIGS. 12 and 13, taken substantially along line 14—14 of FIG. 11;

FIG. 15 is a sectional view like FIGS. 12, 13 and 14, taken substantially along line 15—15 of FIG. 11;

FIG. 16 is a radial development view of the substantially sinusoidal curve which is defined at each axial section station during rotation of the rotor;

FIG. 17 is a perspective view looking from above and towards the rear and one side of a combined propelling and sustaining rotor;

FIG. 18 is a perspective view similar to FIG. 17, but of a boat propeller assembly;

FIG. 19 is a top perspective view of a convoluted plate type radial flow rotor having two working surfaces, and increasing in amplitude from its center outwardly;

FIG. 20 is an axial section view through a double inlet pump incorporating a rotor of the type shown by FIG. 18;

FIG. 27 is a side elevational view of an underwater vehicle equipped with a rotating impeller section patterned atfer the rotor form of FIGS. 21 and 26;

FIG. 28 is a side elevational view of still another form of elongated axial flow impeller, such form comprising a single, radially inwardly directed flow influencing surface;

FIG. 29 is a longitudinal sectional view of a multiple stage radial flow pump embodying the principles of the present invention;

FIG. 30 is an axial sectional view through a ground effect machine embodying the impeller form of FIG. 29; and FIG. 31 is a top plan view of the ground effect machine of FIG. 30.

DETAILED DESCRIPTION

FIGS. 1–9 show a first embodiment of the invention in the form of a rotor R1 suitable for use as a boat propeller. The rotor R1 is shown to comprise an annular blade member 10 secured to a central hub 12 by a plurality of supporting arms 14. The hub 12 is secured to a drive shaft 16 made of bronze, stainless steel, or some other suitable corrosion resistant material. Blade 10, hub 12 and the support arms 14 may constitute a single integral casting, and preferably are made of bronze or some other suitable corrosion resistant material of a type normally used, or suitably usable, for propellers.

Figure 1:
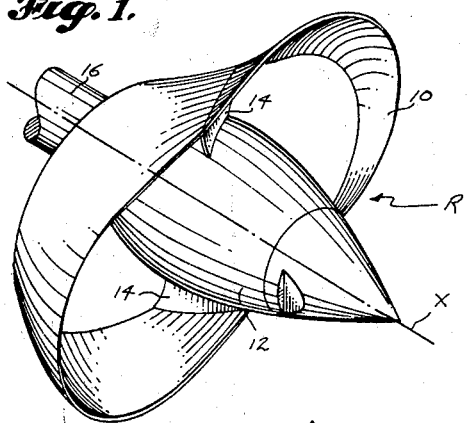
FIG. 1 is a perspective view looking from above and toward the rear and one side of a boat propeller embodying the principles of the present invention.
Figure 2:
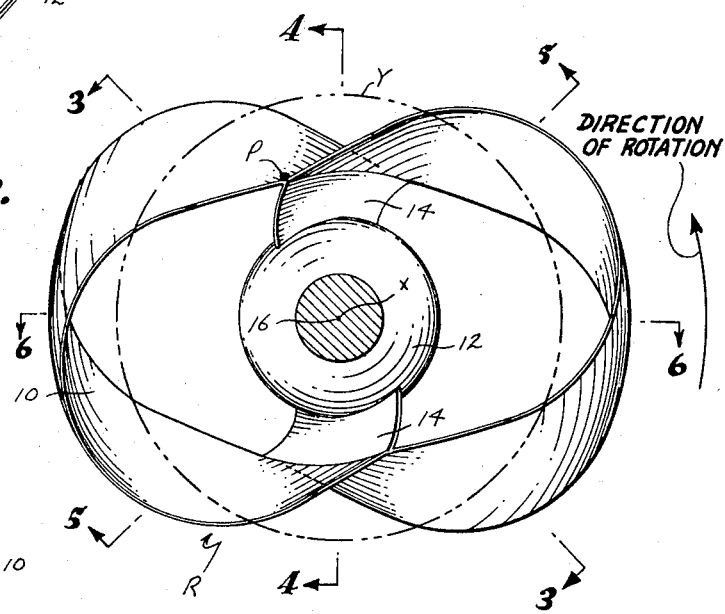
FIG. 2 is a rear elevational view of the propeller of FIG. 1, including a broken line showing of the circular end of a right cylindrical axis from which the blade surfaces are evolved.
Figure 3:
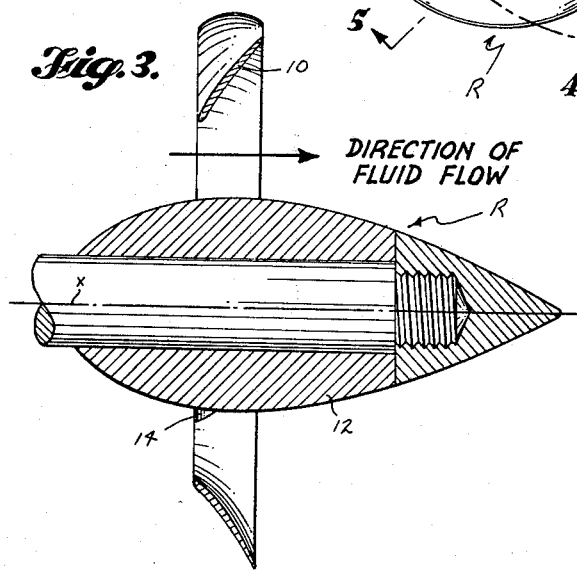
FIG. 3 is an axial section view of the propeller of FIGS. 1 and 2, taken substantially along line 3—3 of FIG. 2.

The shaft 16 is mounted by bearings (not showing) and is driven by a suitable prime mover. The direction of fluid flow is indicated in FIG. 3, and the direction of rotation is indicated in FIG. 2.

The support arms 14 may be constructed to provide minimum interference to the fluid flow. As shown best in FIG. 2, they may curve rearwardly slightly from their inner to their outer ends.

As clearly shown by axial sectional views 3–6, the blade 10 has front and rear edges which lie in parallel radial planes spaced apart along the axis of rotation. Accordingly, the axial length of the blade from its front edge to its rear edge is constant.

In this form of the invention both the inner and outer surfaces of the blade 10 constitute working surfaces. They are of a continuous wavy form and are characterized by a progressively changing axial section profile, the successive profile stations of which constitute successive stations along an axially directed, smoothly undulating curve C. Stated another way, each working surface is convoluted in such a manner that when the blade 10 is rotated its axial section (i.e. a section in which the axis of rotation lies) profile varies continuously at each profile station about the axis of rotation, but is always a part of a continuous, smoothly undulating curve C of constant amplitude whose phase angle changes continuously and smoothly with rotation, and whose axis of generation Y remains fixed in relation to the axis of rotation X. The development of the undulating curve C is shown by FIG. 4, which in addition to a true axial section view along line 4—4 of FIG. 2 include axial showings 3,5,6 corresponding to the axial sections of FIGS. 3, 5 and 6 spaced axially apart by actual pitch distances.

Each complete revolution of the blade 10 generates two complete waves at any axial section, along the line portion of the axis Y at such axial section. This is due to the bicuspal cross-sectional form of the blade. As will be evident to those persons skilled in the art, the number of complete waves generated per revolution may be varied by varying the cross-sectional configuration of the blade. For example, FIG. 10 shows a blade 10' of a tricuspal form in cross section; at any axial section it generates three complete waves per revolution.

The sectional views presented by FIGS. 3–6 show that the blade 10 is an airfoil member of variable camber and angle of attack. The blade 10 is symmetrical in shape at the inner and outer radial extremities and is cambered at all other axial section positions therebetween. Being of bicuspal form the inner radial extremities are opposite to each other and the other radial extremities are opposite each other. The maximum angle of attack occurs where the blade 10 crosses the axis of generation X.

FIG. 2 shows that the leading and trailing edges are of the same configuration, and FIGS. 7–9 show that the cross-sectional configuration of the blade 10 is at all axial stations substantially the same as at the leading and trailing edges. Collectively these views also show that the angular disposition of the section changes progressively from the leading to the trailing edge along a helical path. In the form of FIGS. 1–9 the basic bicuspal shape is rotated such that common points on all the sections, one of which is designated P, lie on helixes extending from the leading edge to the trailing edge, and each having a pitch equal to the axial length of the two waves generated in one revolution.

Using conventional propeller terminology, the "effective pitch" of the rotor R1 is equal to the combined lengths along their axes of all of the waves (sine waves or otherwise) generated in one revolution of the rotor R1. This pitch may be varied to suit different applications by varying either the length of the waves or the number of waves generated per revolution, or both. The "effective area" of the blade 10 is the area swept by the amplitude of the wave in one complete revolution. Stated another way, it is the remainder when the area of the circle formed by the smallest radius (the distance between axis X and point P) is subtracted from the area of the circle formed by the maximum radius (measured along line 6—6).

In operation, fluid flow is axial, i.e. it is generally parallel to the axis of rotation X and the cylindrical axis of generation Y. When flow is at a rate different to that of the rate of propagation of the wave, i.e. the pitch velocity, the streamlined surfaces of the blade 10 will develop dynamic "lift" resulting in the production of both torsional and thrust forces in the fluid and on the blade 10. If the fluid flow is slower than the pitch velocity, due to the introduction into the system of mechanical energy supplied by a prime mover, the device acts as a pump or propeller. When the fluid flow is faster than the pitch velocity the blade 10 takes mechanical energy from the fluid and functions as a turbine. The relative movement of the working surface at any axial section is similar to, and is derived from, the undulating action of a fish's tail or a bird's wing, and this action is utilized to provide the propulsive effect.

A prototype propeller of the form illustrated by FIGS. 1–9 was compared in a test with a conventional propeller, and the results of the test indicated that the prototype propeller was significantly more efficient than the standard propeller. An outboard boat motor was used with first a seven inch (7″) pitch conventional propeller of nine (9″) inches in diameter, and then with a bicuspal prototype of the form illustrated by FIGS. 1–9 which measured approximately nine and three quarters (9.75″) inches across at its largest diameter (along section line 6—6 of FIG. 2) and about seven (7″) inches across at its smallest diameter (along line 4—4 of FIG. 2). A twelve (12′) foot dinghy type boat was used and during both runs the engine was operated at maximum revolutions. The weight of the boat and its load was kept constant.

The two runs produced the following results:

Conventional Propeller, nine inch diameter and seven inch pitch:

Pitch speed = $V_1$ = 14.8 f.p.s.
Boat speed = $V_2$ = 9.2 f.p.s.
Wake speed = $V_3$ = 5.6 f.p.s.
Effective swept area = 0.36 sq. ft.
Measured thrust = 58 lbs.

Theoretical thrust = $MV_1V_3$
$$= \frac{(0.36)(14.8)(62.5)(5.6)}{32} = 58.3 \text{ lbs.}$$

Wake loss = $\frac{1}{2}MV_3^2$
$$= \frac{(0.5)(0.36)(14.8)(62.5)(5.6)^2}{(32)(550)} = 0.291 \text{ H.P.}$$

Assumed wake rotation loss = 0.1 H.P.

Useful H.P. = $(T)(V_2) = \frac{(58)(9.2)}{550} = 0.97$ H.P.

Theoretical H.P. = 1.361 H.P.
Rated H.P. = 2.8 H.P.
Assumed transmission efficiency = 80%
Actual H.P. at propeller = 2.24 H.P.

Theoretical efficiency (net) = $\frac{1.361}{2.24} = 60.7\%$

Propulsion efficiency = $\frac{0.97}{2.24} = 43.3\%$

Unexplained losses = 39.3%

Prototype propeller:
Pitch speed = $V_1$ = 19 f.p.s.
Boat speed = $V_2$ = 9.6 f.p.s.
Wake speed = $V_3$ = 9.4 f.p.s.
Effective swept area = 0.195 sq. ft.
Measured thrust = 66 lbs.

Theoretical thrust = $MV_1V_3$
$$= \frac{(0.195)(19)(62.5)(9.4)}{32} = 66 \text{ lbs.}$$

Wake loss = $\frac{1}{2}MV_3^2$
$$= \frac{(0.5)(0.195)(19)(62.5)(9.4)^2}{(32)(550)} = 0.58 \text{ H.P.}$$

Assumed wake rotation loss = 0.1 H.P.

Useful H.P. = $(T)(V_2) = \frac{(66)(9.6)}{550} = 1.15$ H.P.

Theoretical H.P. = 1.83 H.P.
Assumed H.P. at shaft = 2.24 H.P.

Theoretical efficiency = $\frac{1.83}{2.24} = 81.7\%$

Actual (propulsive) = $\frac{1.15}{2.24} = 51.3\%$

Unexplained losses = 18.3%

Although the test runs were subject to some inaccuracies, the results indicated that the prototype propeller was significantly more efficient than the standard propeller. The unexplained losses, attributed to turbulence, tip loss, etc., were considerably smaller in the run using the prototype propeller than in the run using the conventional propeller.

According to the present invention, a helicopter rotor or a rotating annular wing may be patterned after the propeller R1 of FIGS. 1–9, or the propeller of FIG. 10. Such a sustained lift rotor would be supported in use in a manner such that the axis of rotation is inclined relative to the direction of vehicle travel, and hence also the direction of relative fluid flow. The average dynamic "lift" would have a resultant at right angles to the axis of rotation in a plane parallel to the fluid flow and cutting across the axis of rotation. This resultant force would act in addition to the thrust force of the impeller and would at least in part support the weight of the vehicle.

An aircraft thrust propeller may also be patterned after propeller 10 or propeller 10′.

Further embodiments of the invention, illustrated by FIGS. 11–31 will now be specifically described.

FIGS. 11–16, which are views similar to FIGS. 2–6, relate to a radial flow form of rotor R3 comprising a convoluted ring type of impetus member 10″. The illustrated embodiment may be a cealing fan supported for rotation by a vertical shaft 18 rotated by an electric motor (not shown). The impetus member 10″ is shown to be secured to the shaft 18 by a plurality of radial spokes 20. In such embodiment the inner edge 22 and the outer edge 24 of the annular element 10″ each traverse two complete sine-like curves in their 360° extent about ring member 10″, and the curve at edge 24 is 40° out of phase with the curve at edge 22.

At section 12—12 the inner edge curve 22 lies in a neutral plane 0 (FIG. 12), and the outer edge curve 24 is a maximum displacement above plane 0. As section 13—13 (FIG. 13), the inner edge curve 22 is at maximum displacement above plane 0, and the outer edge curve 24 is substantially at plane 0, and hence is at zero displacement. At section 14—14 (FIG. 14) the inner edge curve 22 is substantially at plane 0, and the outer edge curve 24 is a maximum displacement below plane 0. Finally, at station 15—15 (FIG. 15), the outer edge curve 24 again substantially touches plane 0, and the inner edge curve 22 is at maximum displacement below plane p.

Thus, the inner edge curve 22 crosses plane 0 at 4 points, twice at diametrically opposed points at station 12—12, and twice at diametrically opposed points at station 14—14. It is at these points that the outer ends of the support spokes 20 are secured to ring member 10''.

During rotation the axial section shape of the impetus element 10'' is continuously changing at each stationary axial station in the rotor zone, 360° about the axis of rotation. At each stationary axial station there is a quantity of fluid that is influenced by the changing shape of the working surfaces in approximately the same way it would be influenced by a flexible sheet member, of approximately the same size and shape as the blade 10'' in section, that is made to swing up and down in similar fashion to the manner in which a dolphin moves its tail. Flow is radially outwardly (FIG. 16) and as air leaves the center of the fan, new air flows from below and/or above the fan into that area. As shown by 12, camber is provided on the side of member 10'' that faces towards the flow.

FIG. 17 shows a combination thrust and lift or sustaining device 26 comprising a rotor R4. Rotor R4 includes a generally cylindrical (and zero amplitude forward portion 28, and an axial flow including rearward portion 30, progressively changing rearwardly from a cylindrical cross-section with zero amplitude where it joins forward section 28 to maximum amplitude condition at its trailing edge 32. The impetus portion 30 is of pentacuspal form, i.e. its radial configuration involves five complete sine-like curves. However, in manner of operation it compares generally with rotors R1, R2.

The forward portion 28 of rotor R4 is shown to have a recessed intermediate portion which receives a support ring 34 attached to the end of a streamlined support strut 36. Rotor R4 is suitably supported for rotation relative to the ring 34. It may include a large ring gear 38, adapted to be driven by a spur gear 40 at the end of a drive shaft 42, which extends through the support strut 36.

According to the invention, the axial section shape of the assembly consisting of support ring 34 and the forward portion 28 of rotor R4 is of airfoil form, and is similar to the so-called "annular wing." Thus, as the assembly is moved forwardly by the thrust created by impetus portion 30, the airfoil shaped annular forward portion of the assembly produces lift, in the same manner as an annular wing. In some installations strut 36 may be supported for rotation about its own axis, for the purpose of varying the attitude of rotor R4.

FIG. 18 shows a boat propeller assembly which may be a part of an outboard motor or an outdrive assembly. It includes a rotor R5 which is similar to rotor R4, but which is only of bicuspal form at its trailing edge 44. As in rotor R4, rotor R5 includes a forward portion 46 having zero amplitude. Moving the amplitude of successive sections progressively increases rearwardly from such forward portion 46, through the impetus portion 48 to a maximum amplitude at the rear edge 44. Rotor R5 includes an annular gear 50 which may be driven by a spur gear 52 at the lower end of a vertical drive shaft 54 housed in a streamlined vertical support strut 56. The assembly may be provided with a depending protective strut 58.

FIG. 19 shows a radial flow rotor R6 which is in the nature of a convoluted plate. It is shown to comprise two side working surfaces formed by center-to-edge spiral patterns of smoothly rounded ridge and channel areas 60, 62 of opposite transverse curvature.

As clearly shown by FIG. 20, relating to a double inlet radial pump (e.g. a sewer pump) embodying rotor R6, in axial section the working surface profile is a smoothly undulating sine-like curve, varying in amplitude from substantially no amplitude at its center 64 where it is attached to a drive shaft 66, to a maximum amplitude in its radially outward extent. In the form illustrated two ridges 60 and two channels 62 are originated from the center 64, i.e. two complete sine line curves are transversed in 360° about the rotor. By virtue of the spiral pattern of the ridges 60 and channels 62, the overall section shape varies from one axial or profile station to the next about the axis of rotation according to a definite pattern; each successive profile station is also a successive station along a radially directed undulating curve, as in the earlier forms.

FIG. 20 shows the rotor R6 supported for rotation within a casing 68 having a pair of inlets 70, 72, and a peripheral outlet (not shown). This type of pump is particularly suitable for use as a sewer pump, because it is "non-clogging." It has no part in the nature of a spoke about which articles can wind themselves, or on which debris can snag.

FIGS. 21–28 relate to forms of axially elongated rotors, involving single working surfaces and axial flow. FIGS. 21–26 show a rotatable shaft 72 which includes an axially elongated rotor section R7. In radial section the rotor R7 has zero amplitude at its two ends 74, 76 and progressively increases in amplitude axially inwardly from said ends to a region of maximum amplitude intermediate its ends. The working surface is in essence generated by rotatively advancing along a helical path the generally bicuspal cross-sectional configuration resulting from the generation of two complete sine-like curves from a circular axis of generation, as in the form of FIGS. 1–9.

In the transitional regions of varying amplitude the bicuspal sections also undergo some change in shape and change in size. The form of FIGS. 21–24 is similar to the rotor that would be produced by axially elongating blade 10 of FIGS. 1–9, then gradually tapering the amplitude of the radial section sine-like curves axially outwardly to each end, so that a circular cross-section exists at the ends, and then using only the outer working surface thereof.

Figure 21:
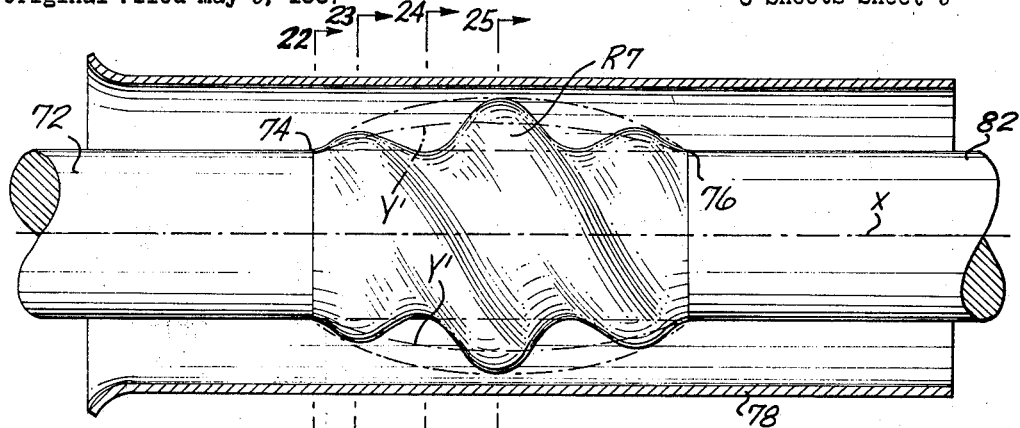
FIG. 21 is a longitudinal sectional view through a pump comprising an axially, elongated rotor having only a single, radially outwardly diverted, flow influencing surface, and showing the rotor in side elevation.
Figure 22:
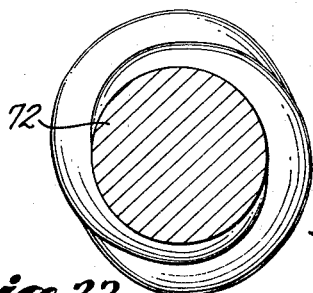
FIGS. 22–25 are cross-sectional views generally like FIGS. 7–9, taken substantially along lines 22—22, 23—23, 24—24 and 25—25, respectively, of FIG. 20, and showing the varying cross-sectional shape of the rotor, and varying angular orientation thereof axially along the impeller.
Figure 23:
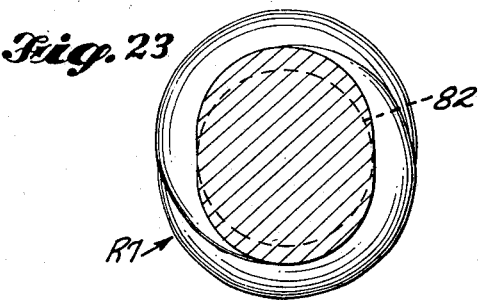
Figure 24:
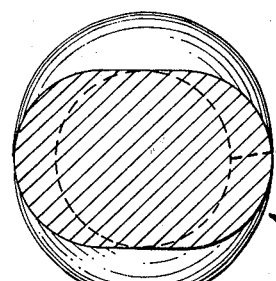
Figure 25:
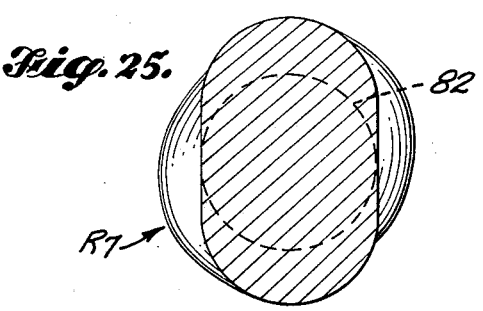

FIG. 21 illustrates a typical installation utilizing rotor R7. In such installation rotor R7 is a part of a shaft 72, and a "over-sized" sleeve 78 is provided about rotor R7. The term "over-sized" is used herein to describe a sleeve or casing having an inside diameter that is substantially larger than the maximum diameter of the rotor section R7, so that there is a generally annular space between the rotor section R7 and the sleeve 78 for a fluid stream. Shaft 72 may be a machine shaft, and the pump provided by rotor section R7 may be utilized for pumping cooling air lengthwise of the shaft 72. In FIGS. 23–25 a broken line circle 80 depicts the diameter of the shaft 72, so that the amplitude and displacement variations at each radial section station can be easily visually compared thereto.

Figure 26:
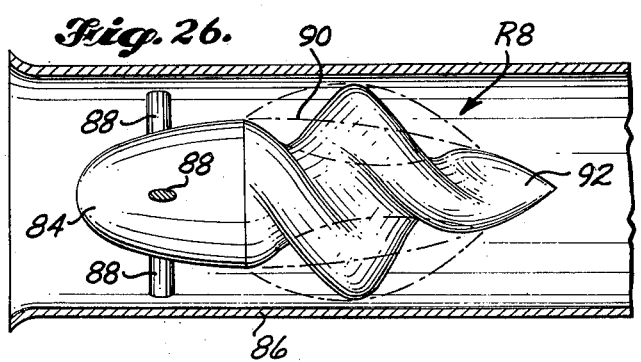
FIG. 26 is a view like FIG. 21, but of a turbine, and wherein the rotor is in the nature of a cone convoluted according to the present invention.

The embodiment shown by FIG. 26 may be a low head turbine (e.g. a tidal station turbine) or an air conditioning fan. It is shown to include a nacelle 84 centered within and secured to a casing 86 by a plurality of radial struts 88. The rotor R8 is suitably supported for rotation rearwardly of the streamlined nacelle 84. In a fan of this type an electric motor for driving the rotor R8 may be housed within the nacelle 84. In a turbine, some means for utilizing (e.g. the generator) or transferring rotary power is instead housed within the nacelle 84.

As will be evident, the axially extending sine-like curve is generated from a tapering cylindrical axis 90 which constitutes an imaginary continuation of the streamlined side surface of nacelle 84. The rotor R8 may also terminate in a bulbous tail section 92 having no amplitude, i.e. it is circular in cross section. Commencing at its forward end, the rotor R8 varies in cross section and amplitude from first a circular cross section (zero amplitude), then through a substantial intermediate portion whereat the cross section is of bicuspal form (similar to FIGS. 22–24) (variable amplitude), and then finally terminating in a circular cross section (zero amplitude).

FIG. 27 shows a vehicle V of elongated form, which may be a water vehicle, comprising a rotating propeller section R7' interposed between two non-rotating sections 94, 96. In this form the working surface of rotor section R7' is generated from a tapering cylindrical axis 98 the character of streamlined surface necessary to complete the streamlined shape of vehicle V. In this form also the amplitude varies from zero at each end to a maximum at some region intermediate the ends. A vehicle of this type would be "silent running" in water due to the low degree of turbulence produced by the rotor R7'.

FIG. 8 discloses another axially elongated form of rotor, designated R9. Rotor R9 is basically like the rotor that would be produced by axially elongating blade 10 of FIGS. 1–9, tapering the amplitude of the inner surface down to zero at both ends, and then filling in the outer surface so that only the inner working surface is available for use. The outer surface of rotor R9 is provided with a cylindrical surface designed to produce little or no disturbance to the surrounding fluid.

Again, there is a smooth change in amplitude from a zero amplitude condition (i.e. circular cross section) at end stations 100, 102, whereat rotor R9 is attached to right cylindrical tubular sections 104, 106, respectively, inwardly to a maximum amplitude region having the characteristic multicuspal shape.

The rotor R9 may be supported for rotation together with the two right cylindrical sections of conduit 104, 106, as an integral assembly. Alternatively, sections 104, 106 may be made stationary and rotor section R9 be supported for rotation between such sections 104, 106. The embodiment of FIG. 28 may be used as either a pump or turbine. It is also suitable for pumping granular solids, such as grain, etc.

FIG. 29 discloses a multiple stage pump 110 comprising a plurality of radial flow type rotors R10 constructed according to the principles of the present invention. In such figure each rotor R10 is shown to be in the shape of a generally convexo-concavo disk having a circular rim configuration and a working surface 112 on its convex side which is formed by a pattern of undulating flow promoting convolutions. The working surface 112 is shown to comprise a center-to-edge spiral pattern of smoothly rounded ridge and channel areas of opposite transverse curvature. As clearly shown by FIG. 29, in axial section the working surface profile is a smoothly undulating sine-like curve, as in the earlier described forms. By virtue of the spiral pattern of the ridges and channels (FIG. 31) the sectional shape varies from one axial station to the next about the axis of rotation X in a definite manner; each successive profile station is also a successive station along a radially developed undulating curve, commencing at zero amplitude at its center and terminating at zero amplitude at the rim of the disk.

In FIG. 29, each rotor R10 is shown to be attached to a drive shaft 114 with its working surface 112 facing toward the main inlet 116. The non-active side of each rotor R10, shown to be concave but which could be flat or even convex has a substantially no energy addition effect on the fluid during rotation.

As the shaft 114, and hence the rotors R10 are rotated by a prime mover, such as an electric motor 118, the working surfaces 112 induce flow in the fluid and cause it in each stage to flow radially outwardly from the center to the rim of the working surfaces 112. In the stages preceding the final stage there is no place for the fluid to go when it reaches the outer limits of the housing except inwardly towards the center portion of the next rotor R10. Peripheral outlet means 120 of a suitable type is provided in the last stage.

FIGS. 29 and 30 show a ground effect machine GEM comprising a rotor R10 supported for rotation about a generally vertical axis Z. It may be provided with a central rotary shaft 122 extending downwardly to the rotor R10 from a prime mover located within a nacelle 124 supported by radial struts 126. An annular collector ring 128 receives the radial discharge of rotor R10 and redirects it generally axially downwardly. The support struts 126 serve to rigidly interconnect the nacelle 124 and the collector ring 28, making the several parts an integral assembly.

The various forms of rotors which have been illustrated and described can be classified into three basic types. The first type has both extremities free and must be supported by some sort of radial spoke structure. Both surfaces are active, and the sine-like generating surfaces may be of constant amplitude. The bicuspal propeller of FIGS. 1–9, the tricuspal propeller of FIG. 10, and the bicuspal fan of FIGS. 11–16 are examples of this type of rotor.

The second type of rotor has one extremity free. It must have a zero amplitude at its support shaft or tube, and it must have both surfaces active. The devices of FIGS. 17 and 18 are examples of axial flow rotors of this type. Rotor R6 shown by FIGS. 19 and 20 is an example of a radial flow rotor of this type.

The third type of rotor has no extremity free. It may involve only one active surface, and the amplitude must be zero at both extremities of the active surface. Rotors R7, R7' and R8 are examples of axial flow rotors of this type, wherein the active surface is an outer peripheral surface. Rotor R9 is an axial flow rotor of this type in which the active surface is at the inner surface of an annular member. Rotor R10 (FIGS. 28–30) is an example of a radial flow rotor of this type.

In the foregoing discussion, the term "free extremity" means a situation whereat the convoluted shape of the active surface is continued to the extremity of the rotor, so that during rotation there is a shape at the extremity that will add energy, and hence a disturbance, to the fluid. When it is said that one or neither extremity is free, this means that at each extremity involved the rotor is provided with a surface or shape which by itself is non-active and causes essentially no disturbance to the fluid in which the rotor rotates.

From the foregoing, further variations, adaptations and modifications in fluid driving or driven rotary devices and their vehicular or other machine installations can be evolved by those skilled in the art to which the invention is addressed, within the scope of the following claims.

What is claimed is:

1. An undulating flow promoting impeller or turbine rotor of fixed shape mountable for rotation about an axis, said rotor comprising a continuous sinuous working surface disposed about the axis of rotation and having a changing axial section shape and ridge and valley regions, with each axial section of said working surface curving smoothly throughout its full extent in the direction of general flow and generally conforming to a sine-like curve which undulates smoothly in the direction of general flow, with each successive axial section occupying a slightly advanced position on its sine-like curve from the position of the preceding axial section on its sine-like curve, and with the change in curvature of the working surface along all paths of actual flow over said working surface occurring at a rate resulting in a smoothly undulating flow pattern being imparted to the flowing medium and the direction of undulation smoothly reversing through the ridge and valley regions.

2. The rotor of claim 1, wherein said working surface is developed from a surface of generation which extends in the direction of general flow, and wherein said working surface traverses a symmetrical sinuous path with respect to said surface of generation within any surface of revolution generated by revolving about the axis of rotation any line which both passes through the working surface and is perpendicular to the direction of general flow.

3. A rotor according to claim 1, wherein said working surface is developed from a surface of generation which extends in the direction of general flow, wherein said working surface is composed of plural regions of varying angle of attack spaced about the axis of rotation, wherein the maximum angle of attack occurs where said working surface crosses the surface of generation, and wherein the angle of attack smoothly and progressively varies from the maximum region to a zero angle of attack at the ridge and valley regions of said working surfaces from said surface of generation.

4. A rotor according to claim 1, wherein at all axial sections of the rotor the axial section shape of the working surface follows a smoothly undulating curve undulating generally radially of the rotor, from generally centrally of the rotor outwardly to the periphery of the rotor, and wherein said working surface is formed by a center to edge spiral pattern of smoothly rounded ridge and channel areas of opposite transverse curvature.

5. A rotor according to claim 4, wherein said rotor is of disc form and the said working surface is on one side only, and the opposite side has an axial section shape which is substantially constant at each axial section angularly around the rotor.

6. A rotor according to claim 4, said rotor comprising an annular blade of airfoil form and a working surface on each of its sides, a support shaft, and radial support means extending radially outwardly to connection points with the radial inner edge of the blade, with said radial inner edge being the leading edge of the airfoil.

7. A rotor according to claim 6, wherein both the radially inner and radially outer boundaries of the blade follow true circles.

8. A rotor according to claim 4, wherein the working surface includes a substantially zero amplitude central portion and a substantially zero amplitude rim portion.

9. A rotor according to claim 4, in the form of a thin convoluted plate having a working surface on each of its sides, each of which includes a substantially zero amplitude central portion and increases in amplitude radially outwardly to a maximum amplitude of the rim of said plate.

10. A rotor according to claim 1, wherein said rotor is generally annular and the said working surface is the inner surface thereof.

11. A rotor according to claim 1, wherein said working surface is on the radially outer periphery of said rotor.

12. A rotor according to claim 1, wherein said rotor is axially elongated and the ridge and valley regions follow along generally helical paths.

13. A rotor according to claim 1, wherein the rotor is a generally annular member and both its inner and outer surfaces are a working surface of the character described.

References Cited

UNITED STATES PATENTS

| 615,154 | 11/1898 | Franklin | 170—168 X |
| 547,210 | 10/1895 | Haussmann | 170—171 |
| 920,554 | 5/1909 | Filippi | 170—135 X |

FOREIGN PATENTS

| 11,212 | 1890 | Great Britain. |
| 751,591 | 6/1956 | Great Britain. |

EVERETTE A. POWELL, JR., Primary Examiner

U.S. Cl. X.R.

416—179, 189, 211